United States Defensive Publication [19] (H) [11] T979,001

Graham [43] Feb. 6, 1979

[54] INTERLAYER ENHANCEMENT OF INTERIMAGE EFFECTS

[76] Inventor: James L. Graham, 44 Briar Hill, Rochester, N.Y. 14626

[21] Appl. No.: 879,574

[22] Filed: Feb. 21, 1978

Related U.S. Application Data

[63] Continuation of Ser. No. 502,573, Sep. 3, 1974, abandoned.

[51] Int. Cl.[2] ..... G03C 3/00

[52] U.S. Cl. ..... 96/74

[57] ABSTRACT

The present invention is directed to a photographic element comprised of a support and, as coatings on the support, a layer comprised of a silver haloiodide emulsion sensitized to green light and a layer comprised of a silver haloiodide emulsion sensitized to red light. Interposed between these layers is a colloidal silver layer. The presence of the colloidal silver produces a favorable interimage effect, as compared to that achieved in its absence.

20 Claims, No Sheets Drawing,

29 Pages Specification

The file of this unexamined application may be inspected and copies thereof may be purchased (849 O.G. 1221, Apr. 9, 1968).